(12) United States Patent
Tsushima et al.

(10) Patent No.: US 12,071,165 B2
(45) Date of Patent: Aug. 27, 2024

(54) AUTOMATIC DRIVING APPARATUS AND AUTOMATIC DRIVING METHOD

(71) Applicant: Mitsubishi Electric Corporation, Tokyo (JP)

(72) Inventors: Naoyuki Tsushima, Tokyo (JP); Takuya Taniguchi, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 17/583,572

(22) Filed: Jan. 25, 2022

(65) Prior Publication Data

US 2022/0289254 A1 Sep. 15, 2022

(30) Foreign Application Priority Data

Mar. 11, 2021 (JP) .................................. 2021-038840

(51) Int. Cl.
*B60W 60/00* (2020.01)
*B60W 30/095* (2012.01)

(52) U.S. Cl.
CPC .. *B60W 60/00274* (2020.02); *B60W 30/0956* (2013.01); *B60W 2552/30* (2020.02);
(Continued)

(58) Field of Classification Search
None
See application file for complete search history.

(56) References Cited

U.S. PATENT DOCUMENTS

2015/0197249 A1* 7/2015 Sakima ................. B60W 30/16
701/96
2017/0305422 A1* 10/2017 Ito ......................... B60W 50/14
(Continued)

FOREIGN PATENT DOCUMENTS

JP 2008-46845 A 2/2008
JP 2012-224316 A 11/2012
(Continued)

OTHER PUBLICATIONS

Machine translation of JP2020003971A (Year: 2024).*
(Continued)

*Primary Examiner* — Aniss Chad
*Assistant Examiner* — Jennifer M Anda
(74) *Attorney, Agent, or Firm* — Sughrue Mion, PLLC; Richard C. Turner

(57) ABSTRACT

To provide an other vehicle behavior prediction apparatus, an other vehicle behavior prediction method, and an automatic driving system which can determine the presence absence of the lane change of the other vehicle with good accuracy, regardless of the change of road shape. An other vehicle behavior prediction apparatus, including: a periphery detector that detects other vehicle which exists around an own vehicle; a road shape detector that detects a road shape where the other vehicle is located; and a lane change predictor that predicts presence or absence of a lane change of the other vehicle based on a detection result of the other vehicle, and changes a determination value which is used when predicting the presence or absence of the lane change of the other vehicle, based on the road shape where the other vehicle is located.

10 Claims, 9 Drawing Sheets

(52) U.S. Cl.
CPC ............... *B60W 2554/4041* (2020.02); *B60W 2554/4042* (2020.02); *B60W 2554/4043* (2020.02); *B60W 2554/4045* (2020.02); *B60W 2554/801* (2020.02)

(56) References Cited

U.S. PATENT DOCUMENTS

| | | | |
|---|---|---|---|
| 2018/0009438 A1* | 1/2018 | Masui | G08G 1/166 |
| 2018/0253975 A1 | 9/2018 | Mizutani | |
| 2019/0389464 A1* | 12/2019 | Nanri | B60W 30/18 |
| 2020/0290629 A1* | 9/2020 | Mine | B60W 40/09 |
| 2021/0373566 A1* | 12/2021 | Agarwal | B60W 30/18145 |

FOREIGN PATENT DOCUMENTS

| | | | | |
|---|---|---|---|---|
| JP | 2017-196973 A | | 11/2017 | |
| JP | 6494121 B2 | | 4/2019 | |
| JP | 2020-3971 A | | 1/2020 | |
| JP | 2020003971 A | * | 1/2020 | |
| WO | WO-2022151369 A1 | * | 7/2022 | ...... B60W 30/18163 |

OTHER PUBLICATIONS

Machine translation WO2022/151369A1 (Year: 2024).*
Office Action dated Apr. 26, 2022 from the Japanese Patent Office in JP Application No. 2021-038840.
Notification of reasons for refusal dated Sep. 6, 2022 from the Japanese Patent Office in Japanese Application No. 2021-038840.

\* cited by examiner

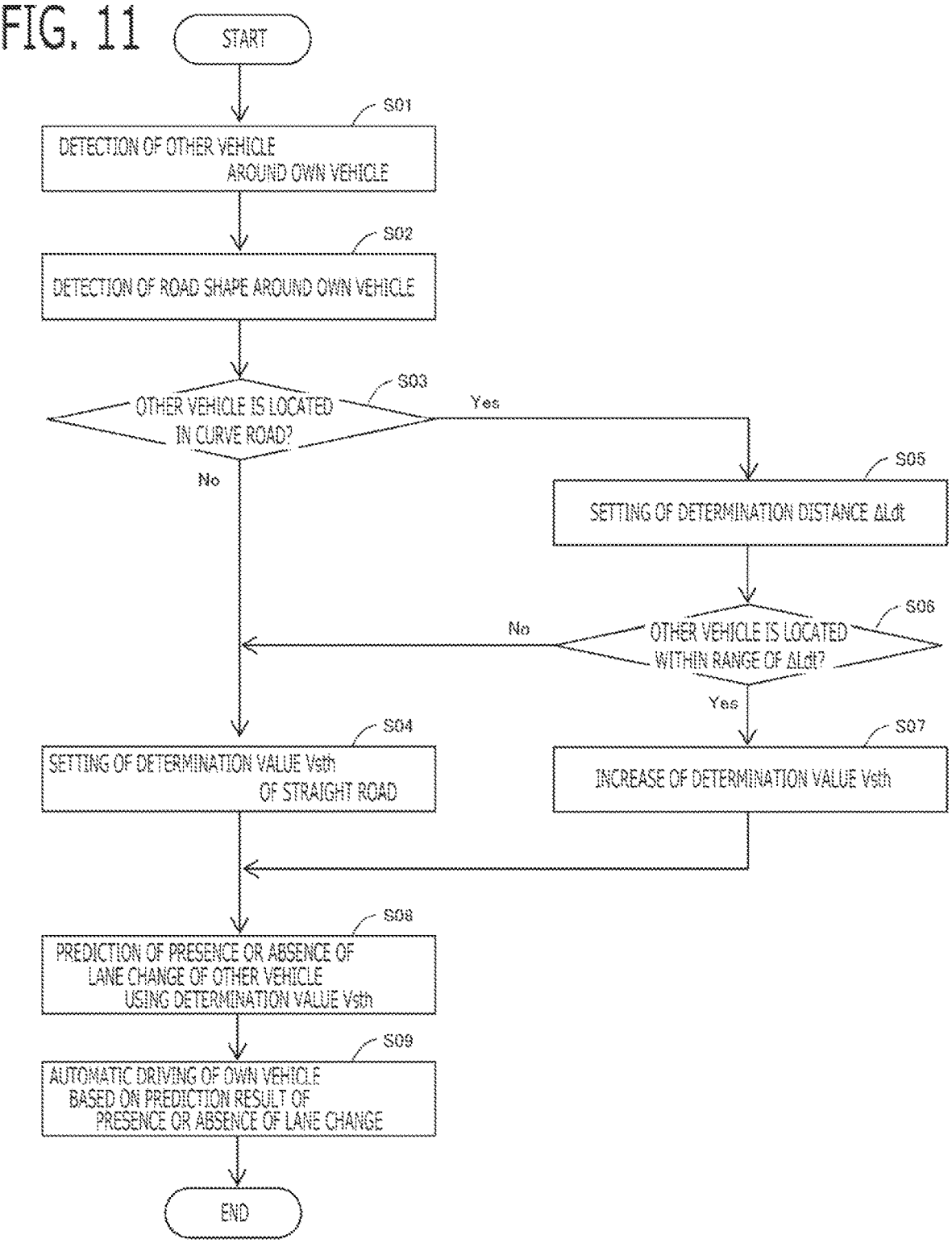

AUTOMATIC DRIVING APPARATUS AND AUTOMATIC DRIVING METHOD

INCORPORATION BY REFERENCE

The disclosure of Japanese Patent Application No. 2021-38840 filed on Mar. 11, 2021 including its specification, claims and drawings, is incorporated herein by reference in its entirety.

BACKGROUND

This present disclosure relates to an other vehicle behavior prediction apparatus, an other vehicle behavior prediction method, and an automatic driving system.

In the technology of JP 6494121 B, the possibility of lane change of the other vehicle is determined based on the traveling speed in the lateral direction of the other vehicle.

SUMMARY

However, depending on the change of road shape, the steering behavior of the vehicle when not changing lane changes. Accordingly, like the technology of JP 6494121 B, if the presence or absence of the lane change is predicted using the same determination value regardless of the change of road shape, erroneous determination occurs. For example, even when not changing lane, in the curve road, in order to adjust with the curvature of the curve, the operating amount of steering increases more than the straight road, the traveling speed component in the road width direction of the other vehicle increases, and it is erroneously determined that the lane change is performed.

Then, the purpose of the present disclosure is to provide an other vehicle behavior prediction apparatus, an other vehicle behavior prediction method, and an automatic driving system which can determine the presence or absence of the lane change of the other vehicle with good accuracy, regardless of the change of road shape.

An other vehicle behavior prediction apparatus according to the present disclosure, including:

a periphery detection unit that detects an other vehicle which exists around an own vehicle;

a road shape detection unit that detects a road shape where the other vehicle is located; and a lane change prediction unit that predicts presence or absence of lane change of the other vehicle based on a detection result of the other vehicle, and changes a determination value which is used when predicting the presence or absence of the lane change of the other vehicle, based on the road shape where the other vehicle is located.

An other vehicle behavior prediction method according to the present disclosure, including:

a periphery detection step that detects an other vehicle which exists around an own vehicle;

a road shape detection step that detects a road shape where the other vehicle is located; and a lane change prediction step that predicts presence or absence of a lane change of the other vehicle based on a detection result of the other vehicle, and changes a determination value which is used when predicting the presence or absence of the lane change of the other vehicle, based on the road shape where the other vehicle is located.

An automatic driving system according to the present disclosure, including:

a periphery detection unit that detects other vehicle which exists around an own vehicle;

a road shape detection unit that detects a road shape where the other vehicle is located;

a lane change prediction unit that predicts presence or absence of a lane change of the other vehicle based on a detection result of the other vehicle, and changes a determination value which is used when predicting the presence or absence of the lane change of the other vehicle, based on the road shape where the other vehicle is located; and an automatic driving unit that drives the own vehicle automatically based on a prediction result of the presence or absence of the lane change of the other vehicle.

Since the steering operation is performed in accordance with the road shape, even if there is no intention of the lane change, the steering behavior of vehicle is changed according to the road shape. Accordingly, if the presence or absence of the lane change of the other vehicle is determined using the same determination value regardless of change of the road shape, erroneous determination will occur. According to the other vehicle behavior prediction apparatus, the other vehicle behavior prediction method, and the automatic driving system of the present disclosure, since the determination value used for prediction is changed based on the road shape where the other vehicle is located, occurrence of erroneous determination of the presence or absence of the lane change can be suppressed.

BRIEF DESCRIPTION OF THE DRAWINGS

FIG. 11 is a flowchart for explaining processing of the automatic driving system and the other vehicle behavior prediction apparatus according to Embodiment 1.

DETAILED DESCRIPTION OF THE EMBODIMENTS

1. Embodiment 1

An automatic driving system 30 and an other vehicle behavior prediction apparatus 35 according to Embodiment 1 will be explained with reference to drawings. The automatic driving system 30 is mounted on an automatic driving vehicle.

1-1. Automatic Driving System 30

Figure 1:
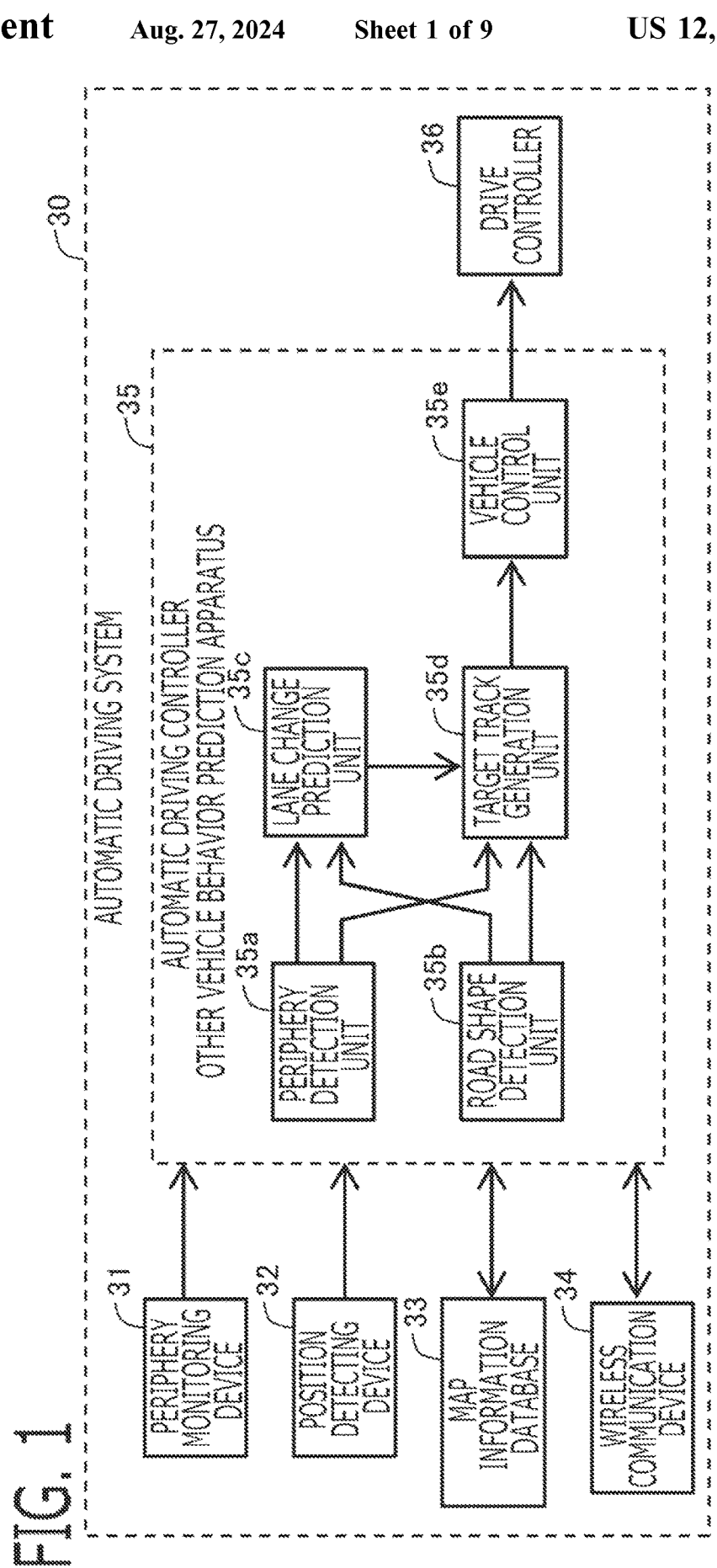
FIG. 1 is a schematic block diagram of the automatic driving system and the other vehicle behavior prediction apparatus according to Embodiment 1.

As shown in FIG. 1, the automatic driving system 30 is provided with a periphery monitoring device 31, a position detecting device 32, a map information database 33, a wireless communication device 34, an automatic driving controller 35, a drive controller 36, and the like. The other vehicle behavior prediction apparatus 35 is embedded in the automatic driving controller 35.

The periphery monitoring device 31 is apparatus which monitor around the vehicle, such as a camera and a radar. As the radar, a millimeter wave radar, a laser radar, an ultrasonic radar, and the like are used. The position detecting device 32 is an apparatus which detects a current position of the own vehicle. And, a GPS antenna which receives the signal outputted from satellites, such as GNSS (Global Navigation Satellite System), is used. The wireless communication device 34 performs a wireless communication with a base station, using the wireless communication standard of cellular communication system, such as 4G and 5G.

In the map information database 33, road information, such as road shape, road sign, and road signal, is stored. The map information database 33 is mainly constituted of a storage apparatus. The map information database 33 may be provided in a server outside the vehicle connected to the network, and the lane change prediction unit 35c and the automatic driving controller 35 may obtain required road information from the server outside the vehicle via the wireless communication device 34.

As the drive controller 36, a power controller, a brake controller, an automatic steering controller, a light controller, and the like are provided. The power controller controls output of power machines, such as an internal combustion engine and a motor. The brake controller controls brake operation of an electric brake apparatus. The automatic steering controller controls an electric steering apparatus. The light controller controls a direction indicator and the like.

Figure 2:
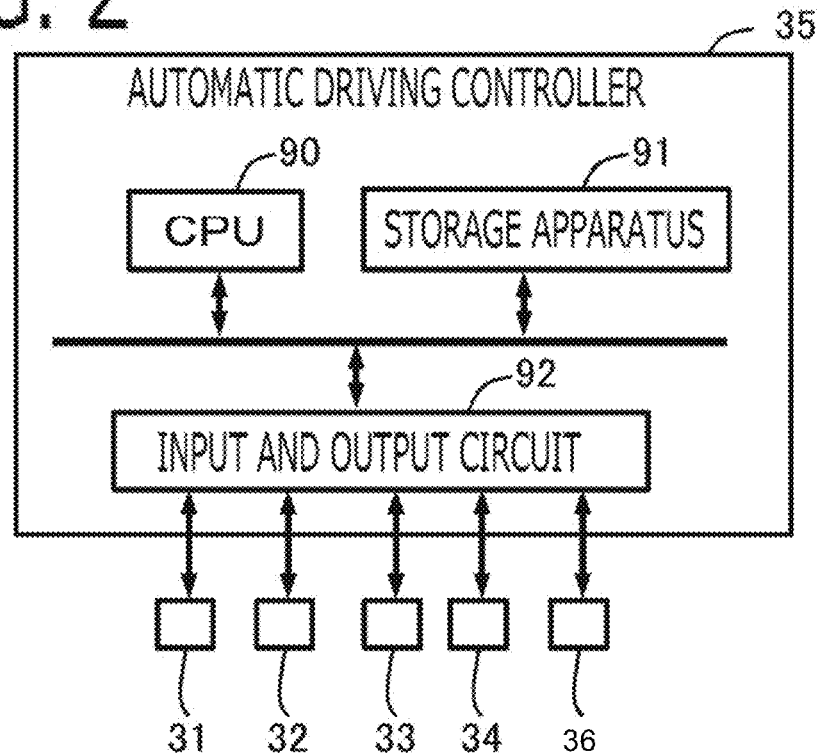
FIG. 2 is a schematic hardware configuration diagram of the automatic driving controller and the other vehicle behavior prediction apparatus according to Embodiment 1.

The automatic driving controller 35 is provided with functional units of a periphery detection unit 35a, a road shape detection unit 35b, a lane change prediction unit 35c, a target track generation unit 35d, a vehicle control unit 35e, and the like. Each function of the automatic driving controller 35 is realized by processing circuits provided in the automatic driving controller 35. As shown in FIG. 2, specifically, the automatic driving controller 35 is provided with an arithmetic processor 90 such as CPU (Central Processing Unit), storage apparatuses 91, an input and output circuit 92 which outputs and inputs external signals to the arithmetic processor 90, and the like.

As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatus, such as RAM (Random Access Memory), ROM (Read Only Memory), a flash memory, EEPROM (Electrically Erasable Programmable Read Only Memory), a hard disk, and a DVD apparatus, are used.

The input and output circuit 92 is provided with a communication device, an A/D converter, an input/output port, a driving circuit, and the like. The input and output circuit 92 is connected to the periphery monitoring device 31, the position detecting device 32, the map information database 33, the wireless communication device 34, and the drive controller 36, and communicates with these devices.

Then, the arithmetic processor 90 runs software items (programs) stored in the storage apparatus 91 and collaborates with other hardware devices in the automatic driving controller 35, such as the storage apparatus 91, and the input and output circuit 92, so that the respective functions of the functional units 35a to 35e included in the automatic driving controller 35 are realized. Setting data items such as a determination value, a determination distance, and map data to be utilized in the functional units 35a to 35e are stored, as part of software items (programs), in the storage apparatus 91 such as a ROM. Each function of the automatic driving controller 35 will be described in detail below.

Figure 3:
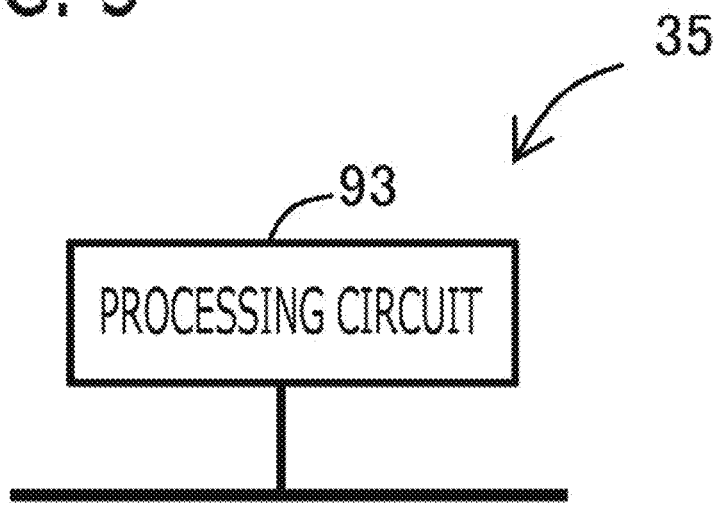
FIG. 3 is an another example of schematic hardware configuration diagram of the automatic driving controller and the other vehicle behavior prediction apparatus according to Embodiment 1.

Alternatively, as shown in FIG. 3, the automatic driving controller 35 may be provided with a dedicated hardware 93 as the processing circuit, for example, a single circuit, a combined circuit, a programmed processor, a parallel programmed processor, ASIC, FPGA, GPU, AI chip, or a circuit which combined these.

The periphery detection unit. 35a detects the other vehicle and the like which exist around the own vehicle. The periphery detection unit 35a detects a position, a traveling direction Dim, a traveling speed Vs, and the like of the own vehicle, based on the detection information obtained from the periphery monitoring device 31, and the position information on the own vehicle obtained from the position detecting device 32. The periphery detection unit 35a detects an obstacle, a pedestrian, a road sign, and the like other than the other vehicle.

The road shape detection unit 35b detects a road shape around the own vehicle. The road shape detection unit 35b detects a road shape where the other vehicle detected by the periphery detection unit 35a is located. In the present embodiment, the road shape detection unit 35b detects a shape of lane marking of road and the like, based on the detection information on the lane marking, such as a white line and a road shoulder, which is obtained from the periphery monitoring device 31; and detects a shape of driving lane, a number of driving lane, and a position of driving lane with respect to each detection object, based on the detected shape of lane marking of road and the like. For example, the lane marking of road is expressed by a polynomial of plural-order (for example, third-order); and a tangential direction and a curvature of each position of the lane marking can be calculated using the polynomial.

The road shape detection unit 35b may detect the road shape around the own vehicle, based on the position information on the own vehicle obtained from the position detecting device 32, the position information on the other vehicle detected by the periphery detection unit 35a, the road information obtained from the map information database 33, and the like.

The target track generation unit 35d determines a target traveling track which is adapted to the condition of the other vehicle, the obstacle, and the pedestrian which exist around the own vehicle detected by the periphery detection unit 35a, and the road shape around the own vehicle detected by the road shape detection unit 35b. The target traveling track is a traveling plan of time series of a position of the own vehicle, a traveling direction of the own vehicle, a speed of the own vehicle, a driving lane, a position where lane is changed, and the like at each future time.

For example, the target track generation unit 35d determines the target traveling track which avoids contact with the other vehicle, the obstacle, the pedestrian, or the like, when the other vehicle, the obstacle, the pedestrian, or the like is detected in front of the own vehicle by the periphery monitoring device 31.

The target track generation unit 35d determines the target traveling track, based on the prediction result of the presence or absence of the lane change of the other vehicle by the lane change prediction unit 35c described below. For example, when the other vehicle is predicted to change lane to the own-lane, the target track generation unit 35d determines the target traveling track (for example, acceleration, deceleration, lane change) which avoids contact with the other vehicle. When the other vehicle is predicted to change lane from the own-lane to the adjacent lane, the target track generation unit 35d determines the target traveling track (for example, acceleration, deceleration) which does not consider contact with the other vehicle.

The vehicle control unit 35e controls the vehicle to follow the target traveling track of the own vehicle generated by the target track generation unit 35d. For example, the vehicle control unit 35e decides a target speed, a target steering angle, an operation command of the direction indicator, and the like. Each decided command value is transmitted to the drive controller 36, such as the power controller, the brake controller, the automatic steering controller, and the light controller.

The power controller controls the output of power machines, such as the internal combustion engine and the motor, so that the speed of the own vehicle follows the target speed. The brake controller controls the brake operation of the electric brake apparatus so that the speed of the own vehicle follows the target speed. The automatic steering controller controls the electric steering apparatus so that the steering angle follows the target steering angle. The light controller controls the direction indicator according to the operation command of the direction indicator.

1-2. Lane Change Prediction Unit 35C

The lane change prediction unit 35c predicts presence or absence of a lane change of the other vehicle, based on the detection result of the other vehicle. The lane change prediction unit 35c changes a determination value which is used when predicting the presence or absence of the lane change of the other vehicle, based on the road shape where the other vehicle is located.

Since the steering operation is performed in accordance with the road shape, even if there is no intention of the lane change, the steering behavior of vehicle is changed according to the road shape. Accordingly, if the presence or absence of the lane change of the other vehicle is determined using the same determination value regardless of change of the road shape, erroneous determination will occur. According to the above configuration, since the determination value used for prediction is changed based on the road shape where the other vehicle is located, the occurrence of erroneous determination can be suppressed.

The lane change prediction unit 35c changes the determination value from the determination value when the road shape is the straight road, when the road shape where the other vehicle is located is the curve road.

Even if there is no intention of the lane change, the steering operation in the curve road becomes larger than that in the straight road. According to the above configuration, since the determination value is changed from the determination value when the road shape is the straight road when the road shape where the other vehicle is located is the curve road, the occurrence of erroneous determination can be suppressed.

<Determination by Traveling Speed Component in Road Width Direction>

In the present embodiment, the lane change prediction unit 35c predicts that the other vehicle changes lane, when a magnitude (absolute value) of the traveling speed component Vsx in the road width direction of the other vehicle exceeds the determination value Vsth; and predicts that the other vehicle does not change lane, when the magnitude (absolute value) of the traveling speed component Vsx in the road width direction of the other vehicle is less than the determination value Vsth. The determination value Vsth in this determination is set to a positive value. Then, the lane change prediction unit. 35c increases the determination value Vsth from the determination value when the road shape is the straight road, when the road shape where the other vehicle is located is the curve road.

When the road shape is the curve road, the steering is operated in order to travel along with the curve. For example, if excess and deficiency occur in the operating amount of the steering with respect to the curvature radius of the curve, the vehicle tends to deviate from the driving lane. Accordingly, in order to maintain the vehicle within the lane, the operating amount of the steering is increased or decreased by feedback. In this case, if excess and deficiency occur in the operating amount of the steering with respect to the curvature of the curve, the magnitude of the traveling speed component Vsx in the road width direction of the other vehicle becomes large, and erroneous determination of changing lane is easy to be done. According to the above configuration, the determination value Vsth is increased from the determination value when the road shape is the straight road, when the road shape where the other vehicle is located is the curve road. Accordingly, even when the magnitude of the traveling speed component Vsx in the road width direction of the other vehicle becomes large by feedback operation of the steering for traveling along with the curve, erroneous determination of changing lane can be suppressed.

Figure 4:
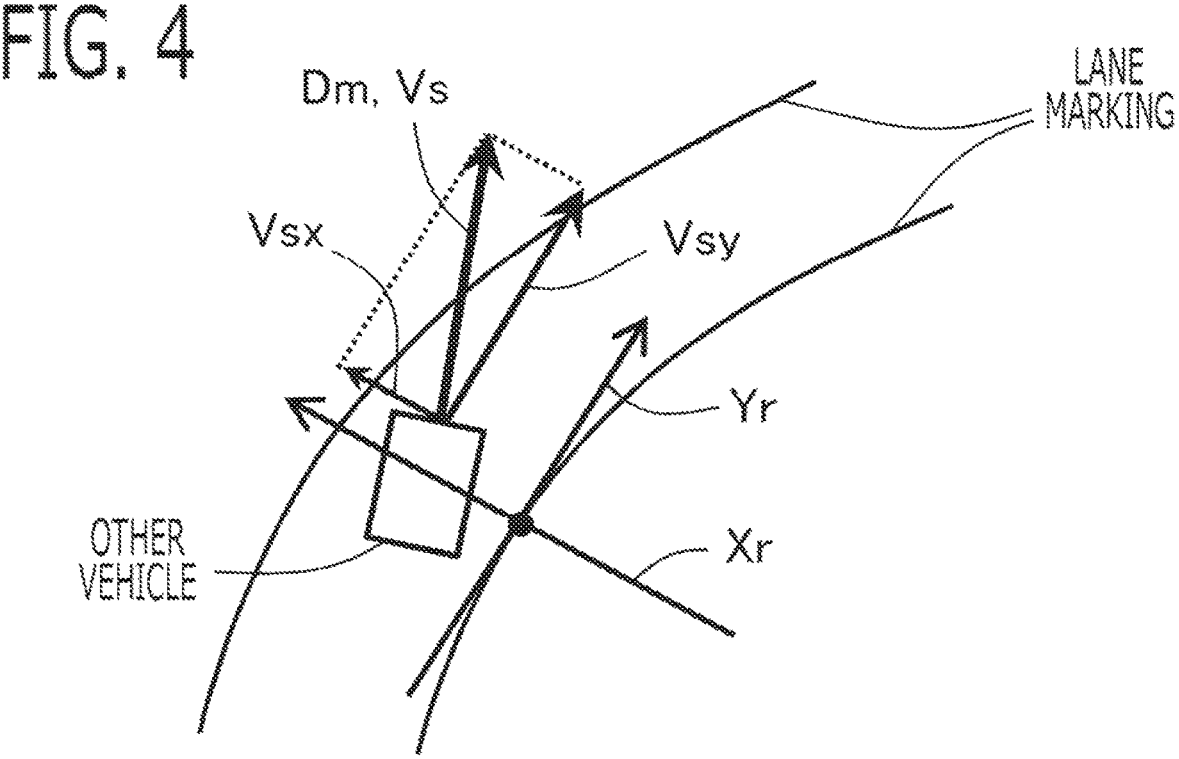
FIG. 4 is a figure for explaining calculation of the traveling speed component in the road width direction of the other vehicle according to Embodiment 1.

As shown in FIG. 4, the lane change prediction unit 35c sets a tangential direction of a portion, where the other vehicle is located, of the lane marking detected by the road shape detection unit 35b, as an extending direction Yr of the road; and sets a direction orthogonal to the set extending direction Yr of the road, as a road width direction Xr. Then, the lane change prediction unit 35c calculates the traveling speed component Vsx in the road width direction of the other vehicle Xr, based on the set road width direction Xr, and the traveling direction Dm and the traveling speed Vs of the other vehicle detected by the periphery detection unit 35a. And, the lane change prediction unit 35c calculates the traveling speed component Vsy of the other vehicle in the extending direction Yr of the road, based on the set extending direction Yr of the road, and the traveling direction Dm and the traveling speed Vs of the other vehicle detected by the periphery detection unit 35a.

When the traveling speed component Vsx in the road width direction is a component toward the left side of the lane, and the magnitude of the traveling speed component Vsx in the road width direction exceeds the determination value Vsth, the lane change prediction unit 35c predicts that the other vehicle changes lane to the left side lane. The traveling speed component Vsx in the road width direction when the traveling speed component Vsx in the road width direction is a component toward the left side of the lane is referred to as a traveling speed component Vsx in the road width direction of left side. On the other hand, when the traveling speed component Vsx in the road width direction is a component toward the right side of the lane, and the magnitude of the traveling speed component Vsx in the road width direction exceeds the determination value Vsth, the lane change prediction unit 35c predicts that the other vehicle changes lane to the right side lane. The traveling speed component Vsx in the road width direction when the traveling speed component Vsx in the road width direction is a component toward the right side of lane is referred to as a traveling speed component Vsx in the road width direction of right side.

<Determination Behavior>

Figure 5:
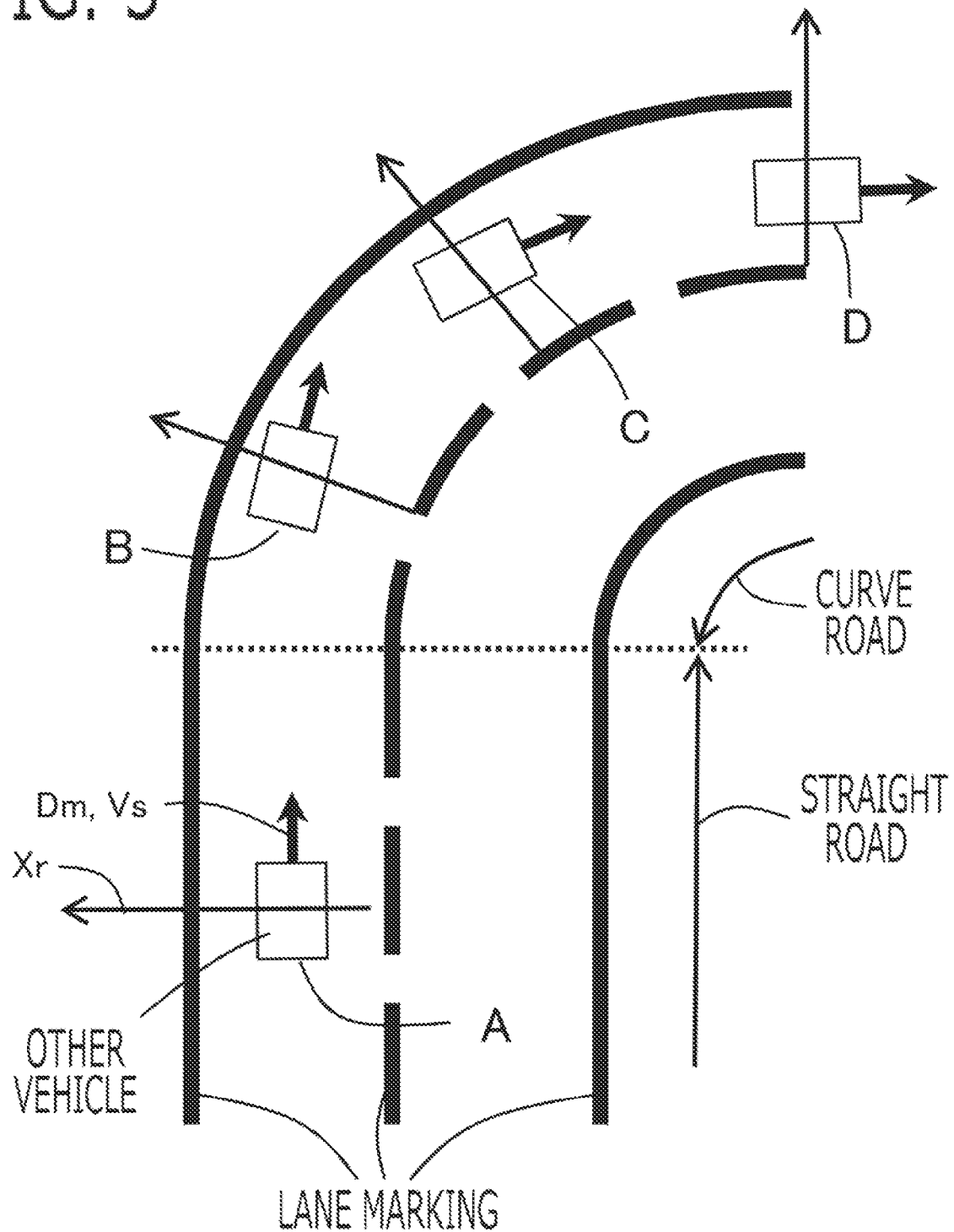
FIG. 5 is a figure for explaining prediction of the presence or absence to the changing lane according to Embodiment 1.
Figure 6:
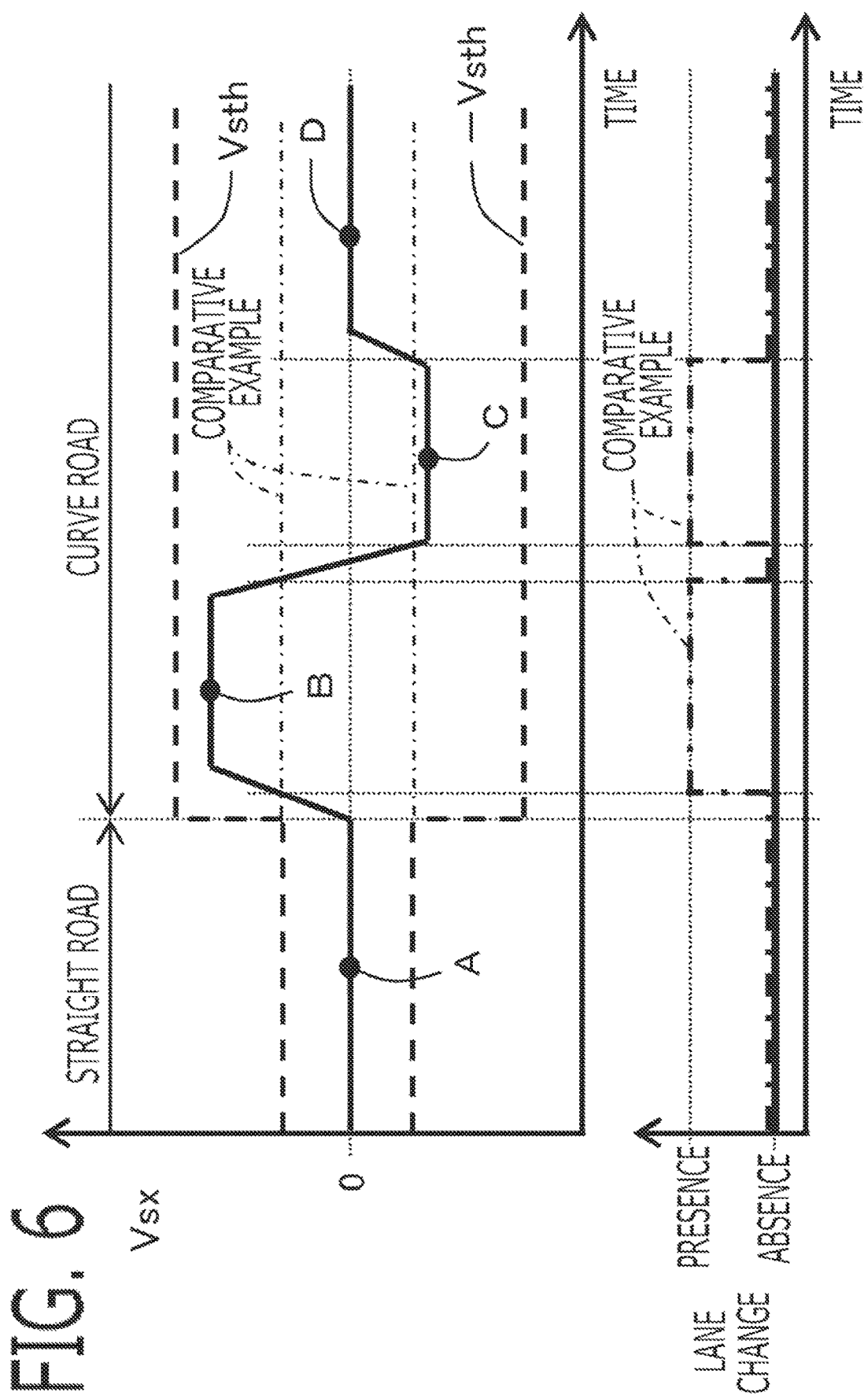
FIG. 6 is a time chart for explaining prediction of the presence or absence of the lane change according to Embodiment 1.

FIG. 5 shows the behavior of the other vehicle which exists around the own vehicle (for example, front). FIG. 6 shows the traveling speed component Vsx in the road width direction of the other vehicle, and the prediction result of the presence or absence of the lane change. The traveling speed component Vsx in the road width direction of left side is set to a positive, and the traveling speed component Vsx in the road width direction of right side is set to a negative. A positive/negative reversing value of the determination value Vsth is compared with the traveling speed component Vsx in the road width direction of right side. In FIG. 6, the dashed dotted line shows the comparative example that the determination value is not changed in the curve road.

At the time point A, when the other vehicle is traveling the straight road, operation of the steering is small and the magnitude of the traveling speed component Vsx in the road width direction is small. Accordingly, in both of the example of the present embodiment and the comparative example, the magnitude of the traveling speed component Vsx in the road width direction is less than the determination value Vsth, and it is predicted that there is no lane change.

At the time point B, after the other vehicle starts to travel the curve road, operation of the steering is delayed, the other vehicle shifts to left side with respect to the center of the driving lane, and the magnitude of the traveling speed component Vsx in the road width direction of left side becomes large. Accordingly, in the comparative example, the magnitude of the traveling speed component Vsx in the road width direction exceeds the determination value, and it is erroneously determined that there is the lane change. On the other hand, in the example of the present embodiment, the determination value Vsth is increased from the determination value of the straight road, and it is normally determined that there is no lane change.

After the time point B, the other vehicle is operating the steering to right side in order to return the left side deviation of the vehicle, and the operating amount to right side becomes large with respect to the curvature radius of curve. Accordingly, at the time point C, the absolute value of the traveling speed Vsx in the road width direction of right side becomes large. In the comparative example, the absolute value of the traveling speed Vsx in the road width direction exceeds the determination value, and it is erroneously determined that there is the lane change. On the other hand, in the example of the present embodiment, the determination value is increased from the determination value of the straight road, and it is normally determined that there is no lane change.

After that, since the vehicle returned to the vicinity of the center of lane, the steering is operated to left side. After the time point D, the operating amount of the steering suitable for the curvature radius of curve is set, and the other vehicle is traveling along the center of the driving lane. Accordingly, the absolute value of the traveling speed Vsx in the road width direction becomes small, and in both of the example of the present embodiment and the comparative example, it is normally determined that there is no lane change.

<Change of Determination Value by Curvature Radius>

When the road shape where the other vehicle is located is the curve road, the lane change prediction unit 35c increases the determination value Vsth, as the curvature radius of the curve road becomes small.

As the curvature radius of the curve road becomes small, the curve becomes steep, the feedback operating amount of the steering and the centrifugal force become large, and the traveling speed component Vsx in the road width direction becomes large. According to the above configuration, since the determination value Vsth is increased as the curvature radius of the curve road becomes small, erroneous determination can be suppressed.

When the curvature radius of the curve road changes halfway, the lane change prediction unit 35c may change the determination value Vsth, based on the curvature radius of the curve road where the other vehicle is located currently. According to this configuration, the determination value Vsth can be changed appropriately according to the curvature radius of the curve road which changes halfway, and erroneous determination can be suppressed.

Figure 7:
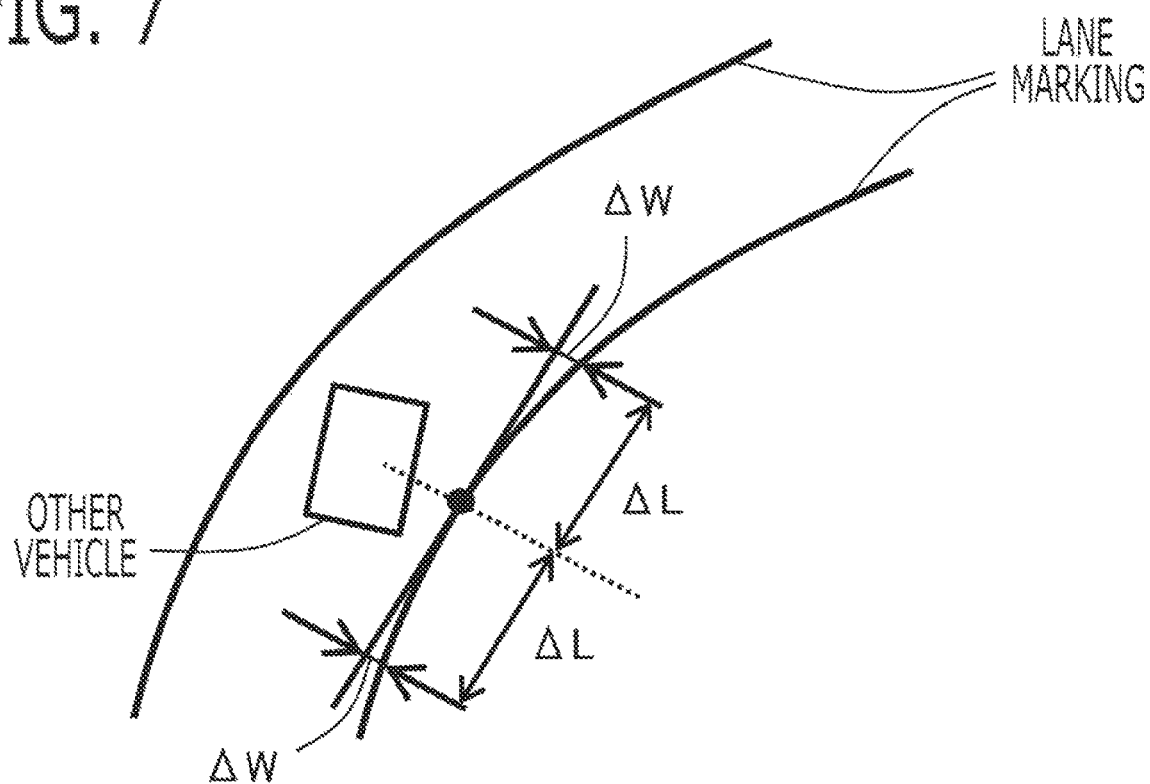
FIG. 7 is a figure for explaining calculation of the curvature radius of the curve road according to Embodiment 1.
Figure 8:
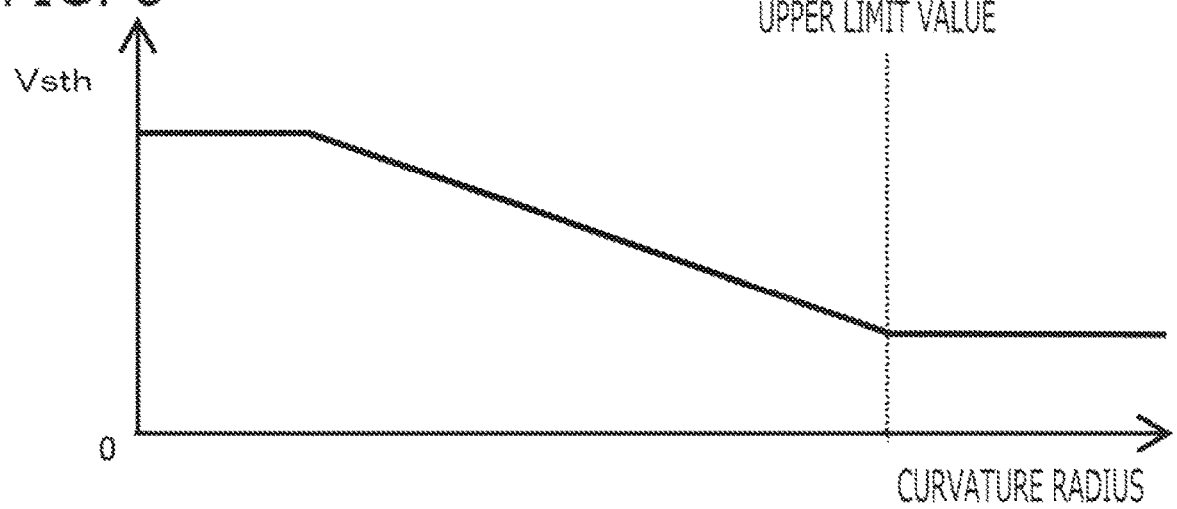
FIG. 8 is a figure for explaining setting of the determination value according to the curvature radius according to Embodiment 1.

The lane change prediction unit 35c calculates the curvature radius of a portion, where the other vehicle is located, of the lane marking detected by the road shape detection unit 35b. The curvature radius is calculated by various well-known methods. For example, as shown in FIG. 7, the curvature radius is calculated based on variation widths ΔW of portions of the lane marking which move forward and backward by a prescribed distance ΔL from the lane marking portion where the other vehicle is located, with respect to a tangent of the lane marking portion where the other vehicle is located. By referring to a map data in which a relationship between the curvature radius and the determination value Vsth is preliminarily set, the lane change prediction unit 35c calculates the determination value Vsth corresponding to the calculated curvature radius. As shown in FIG. e, when the curvature radius is greater than or equal to an upper limit value which is considered as the straight road, the determination value corresponding to the straight road is set. And, as the curvature radius becomes smaller than the upper limit value, the determination value is increased from the determination value corresponding to the straight road.

<Change of Determination Value by Traveling Speed>

When the road shape where the other vehicle is located is the curve road, the lane change prediction unit 35c may increase the determination value Vsth, as the magnitude (absolute value) of the traveling speed Vs of the other vehicle becomes large.

As the traveling speed Vs becomes large, the traveling speed component Vsx in the road width direction with respect to the same operating amount of the steering becomes large, and erroneous determination easily occurs. According to the above configuration, since the determination value Vsth is increased as the magnitude of the traveling speed Vs of the other vehicle becomes large, erroneous determination can be suppressed.

For example, by referring to a map data in which a relationship between the traveling speed Vs and a correction value of determination value is preliminarily set, the lane change prediction unit 35c calculates the correction value of determination value corresponding to the current traveling speed Vs of the other vehicle. Then, the lane change prediction unit 35c calculates the final determination value Vsth by adding the correction value of determination value to the determination value calculated based on the curvature radius.

Alternatively, by referring to a map data in which a relationship among the curvature radius, the traveling speed Vs, and the determination value Vsth is preliminarily set, the lane change prediction unit 35c may calculate the determination value Vsth corresponding to the curvature radius of the curve road where the other vehicle is located currently, and the current traveling speed Vs of the other vehicle.

Alternatively, the lane change prediction unit 35c may calculate the first candidate value of determination value based on the curvature radius of the curve road where the other vehicle is located, calculate the second candidate value of determination value based on the traveling speed of the other vehicle, and calculate the larger one of the first candidate value and the second candidate value, as the final determination value Vsth.

<Individual Change of Determination Value of Right Side, and Determination Value of Left Side>

The lane change prediction unit may change individually the determination value VsthL of left side which is used when determining whether the other vehicle changes lane to the left side lane, and the determination value VsthR of right side which is used when determining whether the other vehicle changes lane to the right side lane.

When the traveling speed component Vsx in the road width direction is a component toward the left side of lane, and the magnitude of the traveling speed component Vsx in the road width direction of left side exceeds the determination value VsthL of left side, the lane change prediction unit 35c predicts that the other vehicle changes lane to the left side lane. On the other hand, when the traveling speed component Vsx in the road width direction is a component toward the right side of lane, and the magnitude of the traveling speed component Vsx in the road width direction of right side exceeds the determination value VsthR of right side, the lane change prediction unit 35c predicts that the other vehicle changes lane to the right side lane.

As explained using FIG. 5 and FIG. 6, when operation of the steering is delayed after the other vehicle starts to travel the curve road, the magnitude of the traveling speed component Vsx in the road width direction of left side becomes large when it is the curve road of right side, and the magnitude of the traveling speed component Vsx in the road width direction of right side becomes large when it is the curve road of left side. In the example of FIG. 5 and FIG. 6, the magnitude of the traveling speed component Vsx in the road width direction of curve inner side becomes large in order to return the curve outside deviation of the vehicle due to the operation delay of the steering just after the start of the curve road. But, usually, it becomes smaller than the magnitude of the traveling speed component Vsx in the road width direction of curve outside just after the start of the curve road. Due to influence of the centrifugal force of the curve road, the magnitude of the traveling speed component Vsx in the road width direction of curve outside tends to becomes larger than the magnitude of the traveling speed component Vsx in the road width direction of curve inner side.

Then, when the road shape where the other vehicle is located is the curve road curved to right side, the lane change prediction unit 35c makes the determination value VsthL of left side larger than the determination value VsthR of right side. When the road shape where the other vehicle is located is the curve road curved to left side, the lane change prediction unit 35c makes the determination value VsthR of right side larger than the determination value VsthL of left side.

As mentioned above, when it is the curve road curved to right side, the magnitude of the traveling speed component Vsx in the road width direction of left side tends to become larger than the magnitude of the traveling speed component Vsx in the road width direction of right side. As described above, since the determination value VsthL of left side is made larger than the determination value VsthR of right side when it is the curve road curved to right side, determination accuracy can be improved. On the other hand, when it is the curve road curved to left side, the magnitude of the traveling speed component Vsx in the road width direction of right side tends to become larger than the magnitude of the traveling speed component Vsx in the road width direction of left side. As described above, since the determination value VsthR of right side is made larger than the determination value VsthL of left side when it is the curve road curved to left side, determination accuracy can be improved.

Figure 9:
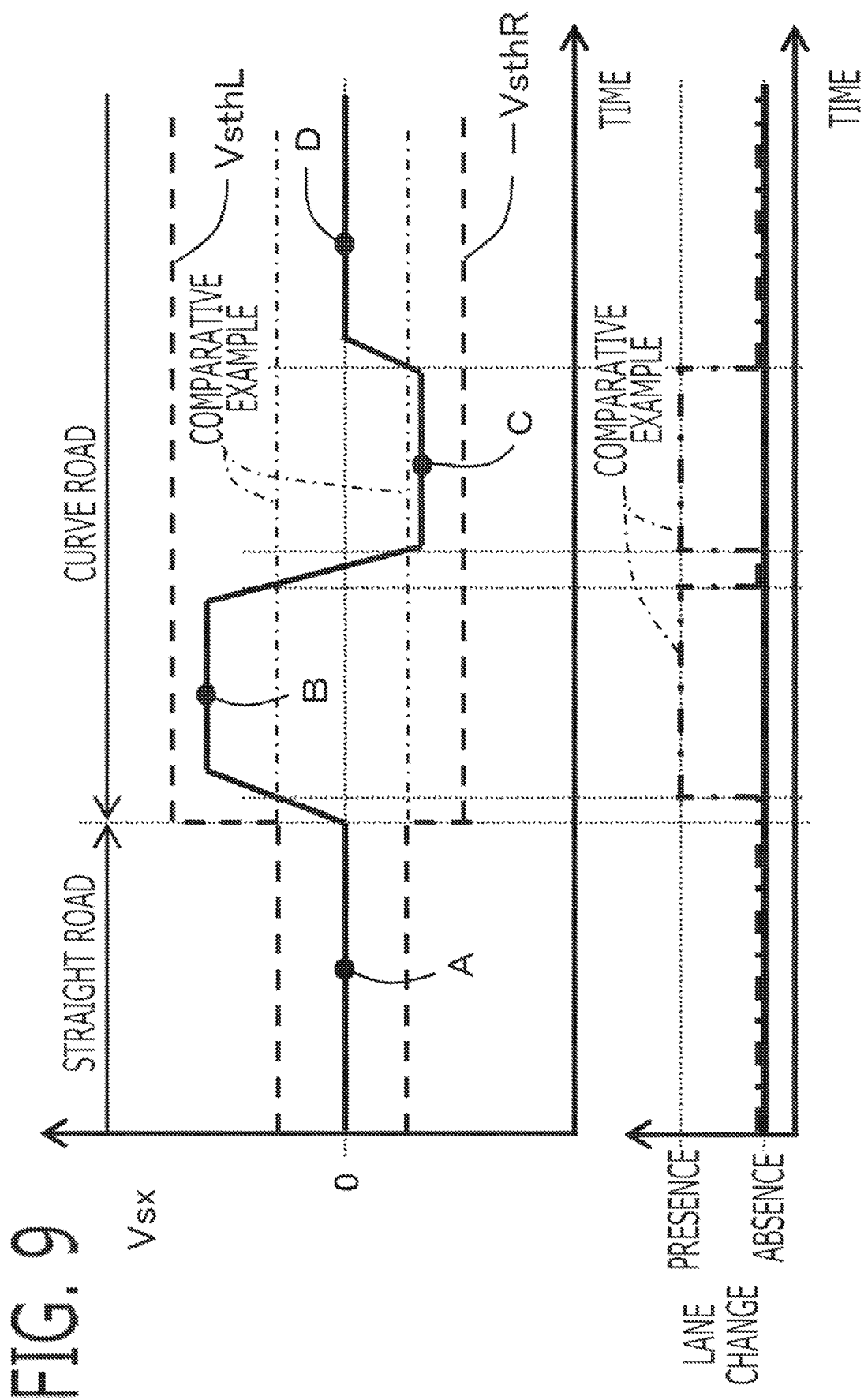
FIG. 9 is a time chart in the case of changing the determination value of right side and the determination value of left side according to Embodiment 1.

For example, as shown in FIG. 9, when it is the curve road curved to right side as similar to FIG. 5, the magnitude of the traveling speed component Vsx in the road width direction of left side becomes larger than the magnitude of the traveling speed component Vsx in the road width direction of right side. Since the determination value VsthL of left side is made larger than the determination value VsthR of right side in accordance with this, the determination accuracy can be improved.

When the road shape where the other vehicle is located is a curve road curved to right side, the lane change prediction unit 35c may increase the determination value VsthL of left side from the determination value when the road shape is the straight road, and may not change the determination value VsthR of right side from the determination value when the road shape is the straight road. When the road shape where the other vehicle is located is the curve road curved to left side, the lane change prediction unit 35c may increase the determination value VsthR of right side from the determination value of right side when the road shape is the straight road, and may not change the determination value VsthL of left side from the determination value of left side when the road shape is the straight road.

The determination value VsthL of left side and the determination value VsthR of right side may be changed based on the curvature radius and the speed Vs of the other vehicle, respectively, as mentioned above.

<Determination Range of the Curve Road>

Figure 10:
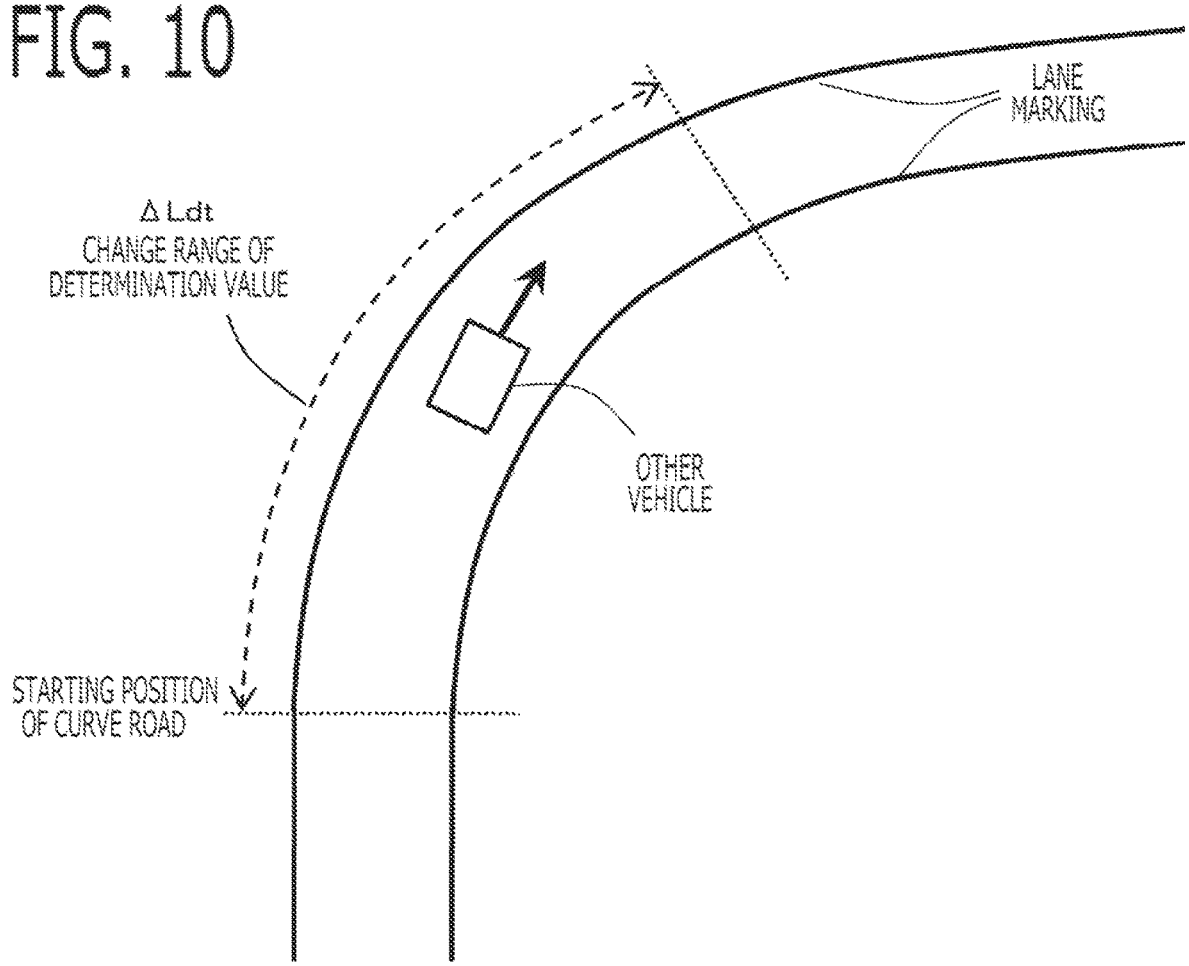
FIG. 10 is a figure for explaining setting of the range of the curve road by the determination distance where the determination value is changed according to Embodiment 1.

As shown in FIG. 10, when the other vehicle is located within a range from the starting position of the curve road to a position of the curve road ahead from the starting position by a determination distance ΔLdt, the lane change prediction unit 35c may change the determination value Vsth from the determination value when the road shape is the straight road. The determination distance ΔLdt and the range of the curve road is adjusted based on the detection result of the curve road by the road shape detection unit 35b, so that the range of the curve road where the determination value Vsth is changed does not exceed the end position of the curve road.

Especially, in the vicinity of the entrance of the curve, feedback operation of the steering for adjusting with the curvature of the curve is performed, excess and deficiency of the operating amount of the steering become large, and the magnitude of the traveling speed component Vsx in the road width direction of the other vehicle becomes large easily. According to the above configuration, when the other vehicle is located within the range from the starting position of the curve road to the position ahead by the determination distance ΔLdt, the determination value Vsth is changed (in this example, increased). Accordingly, even when the magnitude of the traveling speed component Vsx in the road width direction of the other vehicle becomes large by feedback operation of the steering in the vicinity of the entrance of the curve, erroneous determination can be suppressed.

The lane change prediction unit 35c changes the determination distance ΔLdt based on the length (total length) of the curve road. As the length of the curve road becomes long, the determination distance ΔLdt is lengthened. For example, the determination distance ΔLdt may be calculated by multiplying a coefficient of less than one to the length of the curve road. According to this configuration, the appropriate determination distance ΔLdt can be set according to the length of the curve road, and determination accuracy can be improved.

In the present embodiment, the road shape detection unit 35b detects the road shape based on the detection information of the lane marking and the like by the periphery monitoring device 31. Then, when the front prospect is bad and the length of the curve road cannot be detected, the change of the determination distance ΔLdt based on the length of the curve road may not be performed, and the determination distance ΔLdt may be set to a default value.

The lane change prediction unit 35c changes the determination distance ΔLdt based on the curvature radius of the curve road. As the curvature radius of the curve road becomes small, the determination distance ΔLdt is lengthened. Since the operating amount of the steering for adjusting with the curvature of the curve becomes large as the curvature radius of the curve road becomes small, an interval for adjusting the operating amount of the steering in feedback after the starting position of the curve road becomes long. According to the above configuration, since the determination distance ΔLdt is changed based on the curvature radius of the curve road, determination accuracy can be improved.

For example, by referring to a map data in which a relationship between the curvature radius and the correction value of determination distance is preliminarily set, the lane change prediction unit. 35c calculates the correction value of determination distance corresponding to the curvature radius of the road where the other vehicle is located currently. Then, the lane change prediction unit. 35c calculates the final determination value Vsth by adding the correction value of determination distance to the determination distance calculated based on the length of the curve road or the default determination distance.

<Determination Prohibition to Direction where Adjacent Lane do not Exist>

The lane change prediction unit 35c does not determine the presence or absence of the lane change of the other vehicle to a direction where an adjacent lane does not exist. The lane change prediction unit 35c determines the driving lane of the other vehicle, a presence or absence of a driving lane adjacent to the left side of the driving lane of the other vehicle, and a presence or absence of a driving lane adjacent to the right side, based on the detection result of the periphery detection unit 35a and the road shape detection unit 35b. Then, the lane change prediction unit 35c does not determine the presence or absence of the lane change of the other vehicle to the right side, when there is no driving lane adjacent to the right side of the driving lane of the other vehicle. And, the lane change prediction unit 35c does not determine the presence or absence of the lane change of the other vehicle to the left side, when there is no driving lane adjacent to the left side of the driving lane of the other vehicle.

According to this configuration, since unnecessary determination of the lane change to the direction where the adjacent lane does not exist is not performed, determination accuracy can be improved.

<Flowchart>

The processing explained above can be configured as shown in the flowchart of FIG. 11. Processing of FIG. 11 is executed at every predetermined calculation period, for example.

In the step S01, as mentioned above, the periphery detection unit 35a performs a periphery detection step that detects the other vehicle and the like which exist around the own vehicle. The periphery detection unit 35a detects an obstacle, a pedestrian, a road sign, and the like other than the other vehicle.

In the step S02, as mentioned above, the road shape detection unit 35b performs a road shape detection step that detects the road shape around the own vehicle. The road shape detection unit 35b detects a road shape where the other vehicle detected by the periphery detection unit 35a is located. In the present embodiment, the road shape detection unit 35b detects a shape of lane marking of road and the like, based on the detection information on the lane marking, such as a white line and a road shoulder, which is obtained from the periphery monitoring device 31; and detects a shape of driving lane, a number of driving lane, and a position of driving lane with respect to each detection object, based on the detected shape of lane marking of road and the like.

In the step S03 to the step S08, as mentioned above, the lane change prediction unit 35c performs a lane change prediction step that predicts the presence or absence of the lane change of the other vehicle based on the detection result of the other vehicle. When plural other vehicles are detected, about each other vehicle, processing of step S03 to S08 is performed, and the presence or absence of the lane change of each other vehicle is determined.

In the step S03, as mentioned above, the lane change prediction unit 35c determines whether the other vehicle is located in the curve road, based on the road shape where the other vehicle detected by the periphery detection unit 35a and the road shape detection unit 35b is located; it advances to the step S04 when the other vehicle is not located in the curve road; and it advances to the step S05 when the other vehicle is located in the curve road. For example, when the curvature radius of the road where the other vehicle is located is less than or equal to the curve determination value, the lane change prediction unit 35c determines that the road shape is the curve road. And, when the curvature radius is larger than curve determination value, the lane change prediction unit 35c determines that the road shape is the straight road.

In the step S04, the lane change prediction unit 35c sets the determination value when the road shape is the straight road, as the determination value Vsth.

On the other hand, in the step S05, the lane change prediction unit 35c sets the determination distance ΔLdt. When the length of the curve road is detectable by the road shape detection unit 35b, the lane change prediction unit 35c changes the determination distance ΔLdt based on the length of the curve road. The lane change prediction unit 35c changes the determination distance ΔLdt based on the curvature radius of the curve road.

Then, in the step S06, the lane change prediction unit 35c determines whether the other vehicle is located within a range from the starting position of the curve road to a position of the curve road ahead from the starting position by a determination distance ΔLdt; it advances to the step S04 when the other vehicle is not located within the range; and it advances to the step S07 when the other vehicle is located within the range.

In the step S07, the lane change prediction unit 35c increases the determination value Vsth from the determination value when the road shape is the straight road. The determination value Vsth of the curve road is calculated by combining the plural methods mentioned above. For example, as the curvature radius of the curve road where the other vehicle is located becomes small, the lane change prediction unit 35c increases the determination value Vsth. As the magnitude (absolute value) of the traveling speed Vs of the other vehicle becomes large, the lane change prediction unit 35c increases the determination value Vsth. When the road shape where the other vehicle is located is the curve road curved to right side, the lane change prediction unit 35c makes the determination value VsthL of left side larger than the determination value VsthR of right side. When the road shape where the other vehicle is located is the curve road curved to left side, the lane change prediction unit 35c makes the determination value VsthR of right side larger than the determination value VsthL of left side.

Then, in the step S08, as mentioned above, when the magnitude (absolute value) of the traveling speed component Vsx in the road width direction of the other vehicle exceeds the determination value Vsth, the lane change prediction unit 35c predicts that the other vehicle changes lane. When the magnitude (absolute value) of the traveling speed component Vsx in the road width direction of the other vehicle is less than the determination value Vsth, the lane change prediction unit 35c predicts that the other vehicle does not change lane.

In the step S09, as mentioned above, the target track generation unit 35d and the vehicle control unit 35e perform an automatic driving step that drives the own vehicle automatically based on the prediction result of the presence or absence of the lane change of the other vehicle. The target track generation unit 35d determines the target traveling track, based on the prediction result of the presence or absence of the lane change of the other vehicle by the lane change prediction unit 35c. The vehicle control unit 35e controls the vehicle to follow the target traveling track of the own vehicle generated by the target track generation unit 35d.

2. Embodiment 2

The automatic driving system 30 and the other vehicle behavior prediction apparatus 35 according to Embodiment 2 will be explained. The explanation for constituent parts the same as those in Embodiment 1 will be omitted. The basic configuration of the automatic driving system 30 and the other vehicle behavior prediction apparatus 35 according to the present embodiment is the same as that of Embodiment 1. Embodiment 2 is different from Embodiment 1 in that the road shape detection unit 35b detects the road shape around the own vehicle based on the road information obtained from the map information database 33 and the like.

In the present embodiment, the road shape detection unit 35b detects the road shape around the own vehicle, based on the position information on the own vehicle obtained from the position detecting device 32, the position information on the other vehicle detected by the periphery detection unit 35a, the road information obtained from the map information database 33, and the like.

Since the road information of the map information database 33 may not coincide with the actual road condition, the road shape detected based on the detection information of the lane marking and the like by the periphery monitoring device 31 may also be used.

The map information database 33 stores the information related to the road shape, such as the position information on the road, the lane number information, and the information on the curve road (the curvature radius, the length of the curve road). The road shape detection unit 35b obtains the information on the road shape corresponding to the position information on the other vehicle from the map information database 33.

In the present embodiment, similar to Embodiment 1, even when the front prospect by the periphery monitoring device 31 is bad, the length (total length) of the curve road can be obtained from the map information database 33. Accordingly, the lane change prediction unit 35c can change the determination distance ΔLdt with good accuracy based on the length (total length) of the curve road.

3. Other Embodiments (1) In each of the above-mentioned Embodiments, there was explained the case where the other vehicle behavior prediction apparatus is embedded in the automatic driving controller 35. However, the other vehicle behavior prediction apparatus may not be embedded in the automatic driving controller 35. The other vehicle behavior prediction apparatus may be provided alone or may be embedded in other apparatus. And, the other vehicle behavior prediction apparatus may be provided in the vehicle operated by the driver. In this case, for example, the other vehicle behavior prediction apparatus may inform the prediction result of the presence or absence of the lane change of the other vehicle to the driver. For example, when it is predicted that the other vehicle changes lane, the other vehicle behavior prediction apparatus informs that effect to the driver by the display, the sound device, and the like.

A part or all of the other vehicle behavior prediction apparatus may be provided in outside of the own vehicle, such as the server, and the prediction result of the lane change of the other vehicle may be transmitted to the apparatus of the own vehicle by the wireless communication.

(2) In each of the above-mentioned embodiments, the plural methods for changing the determination value Vsth were explained. However, all methods need not to be used, and any one or plural methods may be used.

(3) In each of the above-mentioned embodiments, there was explained the case where the lane change prediction unit 35c predicts that the other vehicle changes lane, when the magnitude of the traveling speed component Vsx in the road width direction of the other vehicle exceeds the determination value Vsth; and the lane change prediction unit 35c predicts that the other vehicle does not change lane, when the magnitude of the traveling speed component Vsx in the road width direction of the other vehicle is less than the determination value Vsth. However, as long as the lane change prediction unit 35c predicts the presence or absence of the lane change of the other vehicle based on the detection result of the other vehicle, other methods may be used. For example, the lane change prediction unit 35c may predict a position of the other vehicle after a forecast time, based on the traveling direction Dm and the traveling speed Vs of the other vehicle. And, when a magnitude of a deviation amount in the road width direction of the predicted position of the other vehicle with respect to the current driving lane of the other vehicle exceeds a determination value, the lane change prediction unit 35c may predict that the other vehicle changes lane. When the magnitude of the deviation amount is less than the determination value, the lane change prediction unit 35c may predict that the other vehicle does not change lane. Also when this kind other methods are used, the lane change prediction unit 35c may change the determination value which is used when predicting the presence or absence of the lane change of the other vehicle, based on the road shape where the other vehicle is located.

(4) In each of the above-mentioned embodiments, there was explained the case where when the other vehicle is located within a range from the starting position of the curve road to a position of the curve road ahead from the starting position by a determination distance ΔLdt, the lane change prediction unit 35c changes the determination value Vsth from the determination value when the road shape is the straight road. However, the lane change prediction unit 35c may change the determination value Vsth from the determination value of the straight road over the whole curve road.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. An automatic driving apparatus, comprising:
   at least one processor; and
   at least one memory including computer program code, when executed, causes the at least one processor to:
   detect an other vehicle which exists around an own vehicle;
   detect a road shape where the other vehicle is located;
   predict presence or absence of lane change of the other vehicle based on a detection result of the other vehicle, and change a determination value which is used when predicting the presence or absence of the lane change of the other vehicle, based on the road shape where the other vehicle is located; and
   drive the own vehicle automatically based on a prediction result of the presence or absence of the lane change of the other vehicle;
   wherein predicting presence or absence of the lane change comprises changing the determination value from the value when a local road shape where the own vehicle is located is a straight road and the road shape where the other vehicle is located is a curved road;
   wherein the lane change prediction predicts that the other vehicle changes lane, when a magnitude of a traveling speed component in a road width direction of a road position where the other vehicle is located exceeds the determination value, and predicts that the other vehicle does not change lane, when the magnitude of the traveling speed component in the road width direction is less than the determination value, and wherein the lane change prediction increases the determination value from the determination value when the road shape is the straight road, when the road shape where the other vehicle is located is the curved road;
   wherein the lane change prediction changes individually the determination value of left side which is used when determining whether the other vehicle changes lane to a left side lane, and the determination value of right side which is used when determining whether the other vehicle changes lane to a right side lane;
   makes the determination value of left side larger than the determination value of right side, when the road shape where the other vehicle is located is a curved road curved to right side; and
   makes the determination value of right side larger than the determination value of left side, when the road shape where the other vehicle is located is a curved road curved to left side.

2. The other vehicle behavior prediction apparatus according to claim 1, wherein changing the determination value further comprises changing the determination value from the determination value when the road shape is the straight road, when the other vehicle is located within a range from the starting position of the curved road to a position of the curved road ahead from the starting position by a determination distance; and setting the determination value to the determination value when the road shape is the straight road, when the other vehicle is located in a range of the curved road further ahead from the position of the curved road ahead from the starting position by a determination distance.

3. The other vehicle behavior prediction apparatus according to claim 2, wherein the lane change predictor changes the determination distance, based on a length of the curved road.

4. The other vehicle behavior prediction apparatus according to claim 2, wherein the lane change predictor changes the determination distance, based on a curvature radius of the curved road.

5. The other vehicle behavior prediction apparatus according to claim 1, wherein, when the road shape where the other vehicle is located is the curved road, the lane change predictor increases the determination value, as the curvature radius of the curve road becomes small.

6. The other vehicle behavior prediction apparatus according to claim 5, wherein, when the curvature radius of the curved road changes midway the lane change predictor changes the determination value, based on the curvature radius of the curved road where the other vehicle is located currently.

7. The other vehicle behavior prediction apparatus according to claim 1, wherein, when the road shape where the other vehicle is located is the curved road, the lane change predictor increases the determination value, as a magnitude of traveling speed of the other vehicle becomes large.

8. The other vehicle behavior prediction apparatus according to claim 1, wherein, when the road shape where the other vehicle is located is the curved road curved to right side, the lane change predictor makes the determination value of left side increase from the determination value of left side when the road shape is the straight road, and does not change the determination value of right side from the determination value of right side when the road shape is the straight road; and when the road shape where the other vehicle is located is the curved road curved to left side, the lane change predictor makes the determination value of right side increase from the determination value of right side when the road shape is the straight road, and does not change the determination value of left side from the determination value of left side when the road shape is the straight road.

9. The other vehicle behavior prediction apparatus according to claim 1, wherein the lane change prediction does not determine the presence or absence of the lane change of the other vehicle to a direction where an adjacent lane does not exist.

10. An automatic driving method, comprising:

detecting an other vehicle which exists around an own vehicle;

detecting a road shape where the other vehicle is located; and predicting presence or absence of a lane change of the other vehicle based on a detection result of the other vehicle, and changing a determination value which is used when predicting the presence or absence of the lane change of the other vehicle, based on the road shape where the other vehicle is located; and drive the own vehicle automatically based on a prediction result of the presence or absence of the lane change of the other vehicle;

wherein predicting presence or absence of lane change comprises changing the determination value from the value when a local road shape where the own vehicle is located is a straight road and the road shape where the other vehicle is located is a curved road;

wherein the lane change prediction predicts that the other vehicle changes lane, when a magnitude of a traveling speed component in a road width direction of a road position where the other vehicle is located exceeds the determination value, and predicts that the other vehicle does not change lane, when the magnitude of the traveling speed component in the road width direction is less than the determination value, and wherein the lane change prediction increases the determination value from the determination value when the road shape is the straight road, when the road shape where the other vehicle is located is the curved road;

wherein the lane change prediction changes individually the determination value of left side which is used when determining whether the other vehicle changes lane to a left side lane, and the determination value of right side which is used when determining whether the other vehicle changes lane to a right side lane;

makes the determination value of left side larger than the determination value of right side, when the road shape where the other vehicle is located is a curved road curved to right side; and makes the determination value of right side larger than the determination value of left side, when the road shape where the other vehicle is located is a curved road curved to left side.

* * * * *